United States Patent [19]

Grimm et al.

[11] Patent Number: 4,775,870

[45] Date of Patent: Oct. 4, 1988

[54] NON-IMPACT PRINTER

[75] Inventors: Thomas R. Grimm, Troy; Jose I. Rodriquez, Cameron; James E. Altic, Temple; Paily T. Varghese, Belton; Erik A. Treszoks, Temple, all of Tex.

[73] Assignee: Texas Instruments Incorporated, Dallas, Tex.

[21] Appl. No.: 12,980

[22] Filed: Feb. 10, 1987

[51] Int. Cl.[4] .......................... G01D 15/10; B41J 3/20

[52] U.S. Cl. .......................... 346/76 PH; 346/139 R; 346/145; 400/120; 400/613.3; 346/139c; 139/145; 400/120; 400/613.3

[58] Field of Search .............. 346/76 PH, 130 C, 145; 400/120, 613.3

[56] References Cited

U.S. PATENT DOCUMENTS 4,297,039 10/1981 Lees .................................... 400/120

4,507,666 3/1985 Kondo et al. .................. 346/76 PH

*Primary Examiner*—E. A. Goldberg

*Assistant Examiner*—Gerald E. Preston

*Attorney, Agent, or Firm*—Thomas G. Devine; Thomas W. DeMond; Melvin Sharp

[57] ABSTRACT

A non-impact printer has a movable printhead carriage for traversing a print medium and has a bracket, also serving as a heat sink, pivotally connected to the printhead carriage. A non-impact printhead is secured to the bracket and positioned to contact the print medium. A spring is positioned between the bracket and the printhead carriage to move the bracket and consequently the attached printhead into contact with the print medium. A printhead adjusting eccentric, causing relative motion between the printhead carriage and the bracket, enables vertical positioning of the printhead with respect to the print medium.

14 Claims, 3 Drawing Sheets

NON-IMPACT PRINTER

BACKGROUND OF THE INVENTION

1. Field of the Invention

This invention relates to a non-impact printer and more specifically to a thermal printer.

2. Description of the Prior Art

Alignment of the thermal printhead and the application of even pressure forcing the printhead to print on the print medium has been a problem in the prior art. Exacting tolerances have been required for the printhead and for the printhead's positioning on the heat sink bracket, and also with respect to the printhead carriage for moving the printhead across the print medium.

A common prior art mechanism for forcing the printhead against the print medium is a spring, secured at opposite sides of the print medium, the spring positioned to force the printhead against the print medium. However, the force applied at the outer edges of the print medium is different from the force applied at, for example, the center of the print medium. This uneven force results in uneven printing.

This inventive printer overcomes these shortcomings by providing an adjustment for moving the supporting bracket, and the printhead, relative to the printhead carriage and relative, vertically, to the print medium. This adjusting mechanism enables much looser tolerances than in the prior art.

To apply even pressure to the printhead in its entire traverse of the print medium, a torsion spring has been positioned to bear against the printhead carriage and the bracket to force the bracket in a direction toward the print medium, thereby causing the printhead to contact the print medium at a constant force throughout its traverse. The spring tension is selected to apply the desired force of the printhead against the print medium.

BRIEF SUMMARY OF THE INVENTION

A non-impact printer has a printhead carriage that is moved back and forth across a print medium. A bracket that serves as a heat sink is pivotally connected to the carriage. A contacting force, in the form of a torsion spring, is applied between the printhead carriage and the bracket at the pivot point so that the bracket is forced toward the print medium, causing the printhead to contact the print medium. The pivotal mount is formed by a snap-in retainer slot in the carriage that accommodates an eccentric pin. The eccentric pin, in turn, passes through an accommodating aperture in the bracket. By turning the eccentric pin, the relative position of the bracket to the printhead carriage is changed. In this manner, the position of the printhead with respect to the print medium is also vertically adjustable.

The principal object of this invention is to provide a thermal printer with a printhead that is readily and easily adjustable in a vertical relationship with the print medium.

Another object of this invention is to provide a thermal printer having a constant force urging the printhead into contact with the print medium irrespective of the horizontal position of the printhead.

These and other objects will be made evident in the detailed description that follows.

DETAILED DESCRIPTION OF THE INVENTION

This invention relates to a non-impact printer having an improved printhead assembly. In this preferred embodiment, the printer is a thermal printer utilizing the thermal printhead for contacting a print medium. In this thermal printer, the head may be adjusted vertically relative to the print medium. Furthermore, a constant contacting force is applied to the printhead to contact the print medium at the same force for the entire traverse of the printhead across the print medium.

Figure 1:
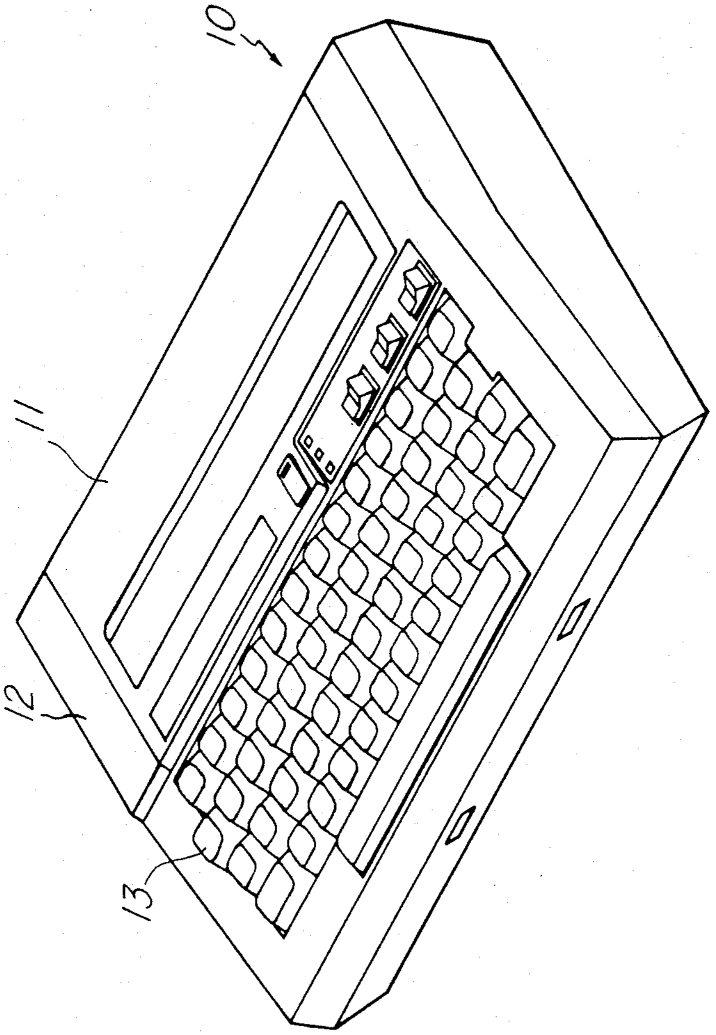
FIG. 1 is a perspective of the non-impact printer.

With this general concept in mind, please turn to FIG. 1 where thermal printer 10 is shown.

The printer 10 is shown with covers 11 and 12 and keyboard 13. In this preferred embodiment, the printer is a Texas Instruments Silent 700/1200 BPS Thermal Printer which is completely described in Texas Instruments Maintenance Manual No. 2546017.

Figure 2:
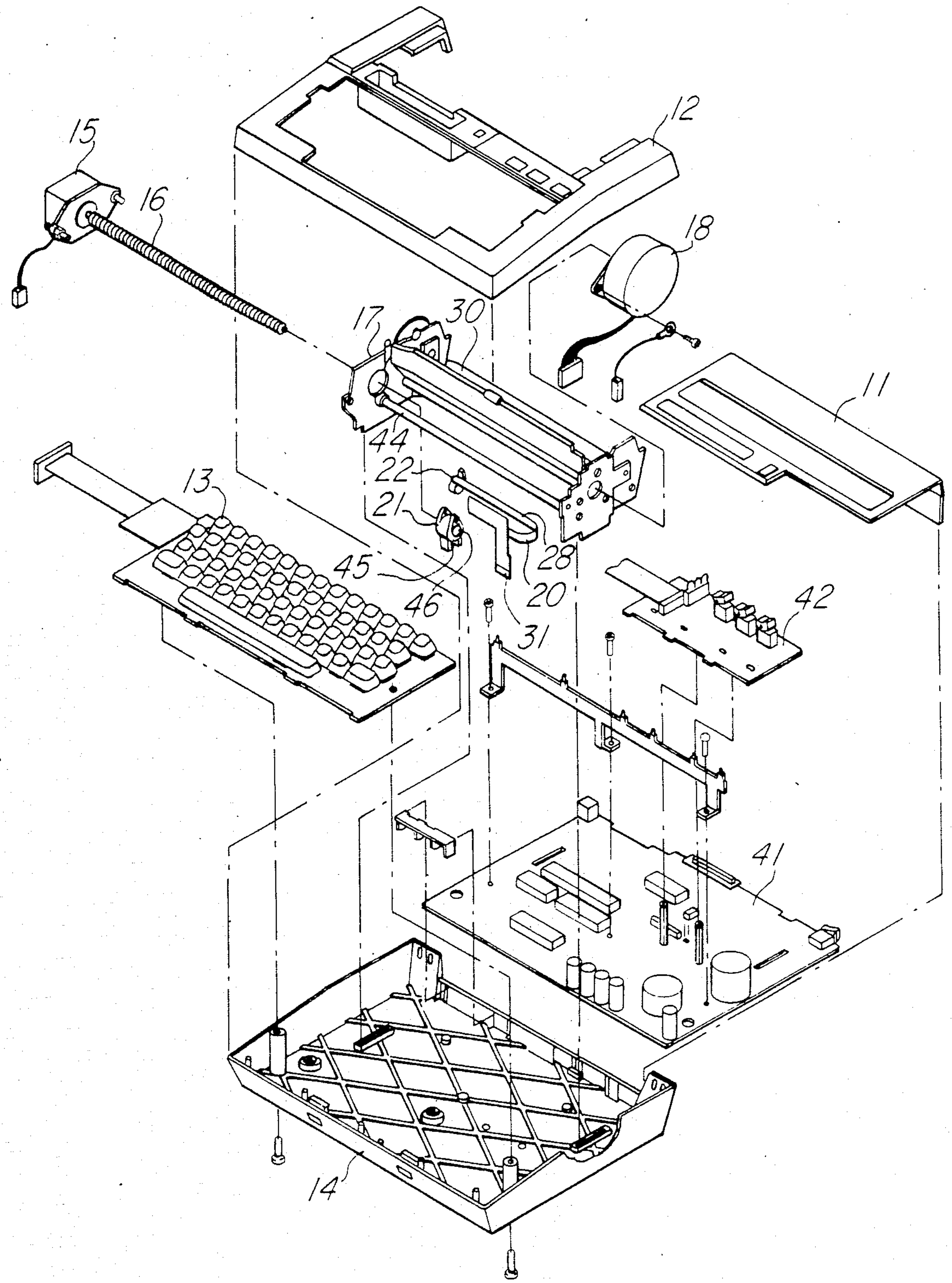
FIG. 2 is an exploded view of the non-impact printer.

The exploded view of FIG. 2 again illustrates covers 11 and 12 of printer 10, together with other internal components. Paper support assembly 17 is shown for receiving drive screw 16 driven by motor 15. Motor 15 attaches to the assembly 17 as illustrated. Carriage 21 engages screw 16 and is driven thereby, along guide 44. Printhead assembly 20 is shown having bracket 22 which pivotally attaches to carriage 21 to be driven back and forth across the width of paper support assembly 17.

Bottom cover 14 is shown into which printed circuit board 41 fits with switch board 42 fitting as shown on circuit board 41. Paper advance motor 18 is shown for advancing paper roll 37 (FIG. 4).

Figure 3:
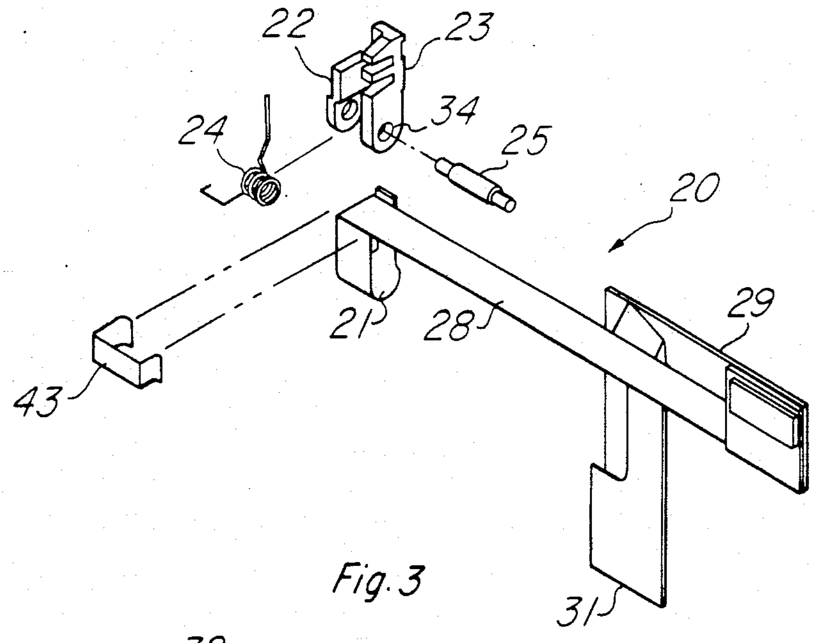
FIG. 3 is an exploded view of the head assembly of the printer.

FIG. 3 illustrates printhead assembly 20 showing bracket 22 with head 23 in place. Eccentric pin 25 passes through apertures 34 in bracket 22 and also through snap-in retainer slot 35 in printhead carriage 21 (FIG. 4). Printed circuit conductors 28 are shown, held in place by strain relief clip 43 and connected (not shown) to head 23. Conductors 28 are connected to and folded in plate 29 and terminate in en connector 31 for receiving electrical logic signals derived from keyboard 13 and communication lines. Torsion spring 24 is shown as it contacts bracket 22 and printhead carriage 21 to urge bracket 22 toward print medium 32, thereby causing head 23 to contact print medium 32.

Figure 4:
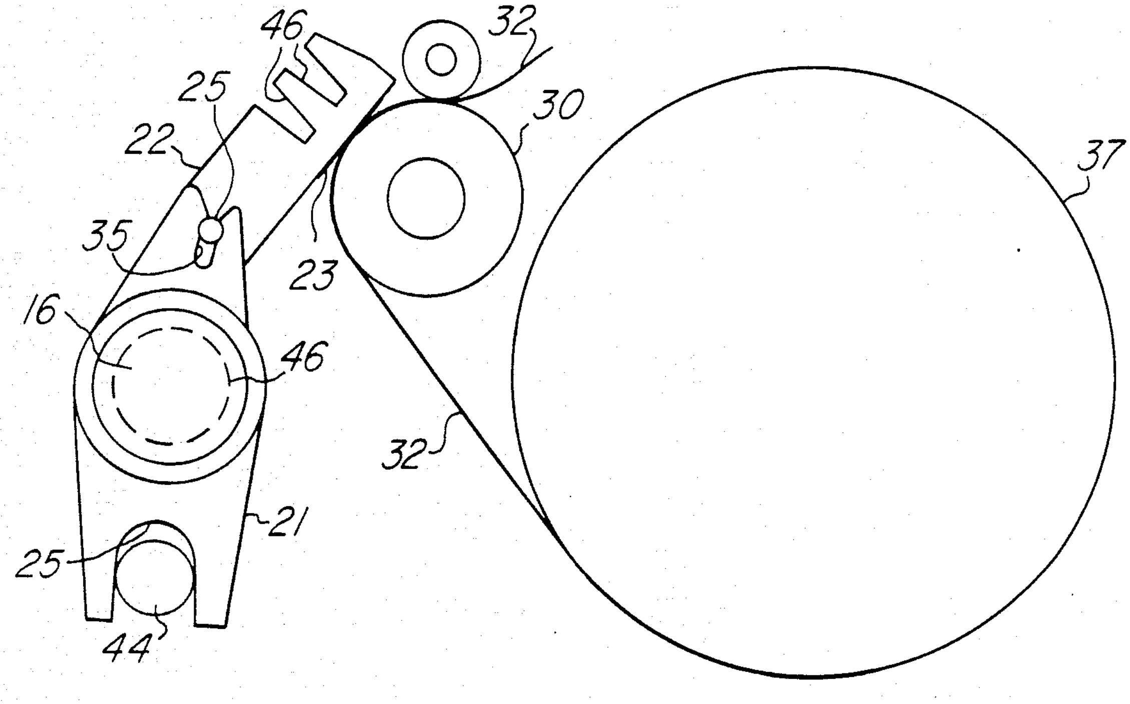
FIG. 4 illustrates a side elevation of the printhead assembly with the printhead in place against the print medium.

FIG. 4 illustrates a paper roll 37 providing print medium 32 (thermal paper in this preferred embodiment) to pass over platen 30. Head 23 is shown urged into contacting print medium 32. Head 23 is a thermal printhead and is, in this preferred embodiment, Rohm Type NS0907-D1. This is obviously an engineering choice and equivalent heads may be substituted. Bracket 22 is shown having thermal printhead 23 affixed thereto and also having fins 47 for conduction of heat away from printhead 23. Eccentric pin 25 is shown in place in the snap-in retainer slot 35. Screw 16 is shown in place, engaging internal screw 46 of printhead carriage 21. Guide slot 45 is shown riding on guide 44.

PREFERRED MODE OF OPERATION

Logic signals are generated in a well known manner by depression of keys of the keyboard 13 and from communication lines, resulting in logic signals being impressed on terminal 31 and ultimately being sent to printhead 23. The aforementioned maintenance manual may be referenced for details. In this preferred embodiment selected terminals of printhead 23 are energized to cause "hot spots" which then impart heat to the thermal paper 32.

Printhead 23 is set in place in bracket 22 (which serves as a heat sink), eccentric pin 25 is passed through apertures 34 and bracket 22 and then that assembly is snapped into place in snap-in retainer 35. Torsion spring 24 is set in place between printhead carriage 21 and bracket 22, as shown, to force bracket 22 toward thermal paper 32. Eccentric pin 25 is turned to adjust the vertical direction of printhead 23 with respect to thermal paper 32 as it passes over platen 30. The eccentric portion bears against apertures 34 causing bracket 22 to move with respect to printhead carriage 21. This motion then provides for very fine vertical adjustment to enable all of the terminals to contact thermal paper 32.

It is contemplated that those skilled in the art may substitute components for those shown in this preferred embodiment without departing from the scope of the invention. For example, it is contemplated that techniques other than thermal printing, such as other thermal transfer techniques may use this invention and therefore the invention is limited only by the appended claims.

I claim:

1. A non-impact printer having a movable printhead carriage for traversing a print medium, for printing desired characters on the print medium, comprising:

(a) motive means, positioned to contact and move the printhead carriage forward and reverse across the print medium;

(b) bracket means, pivotally connected to the printhead carriage;

(c) printhead means, secured to the bracket means and positioned to contact the print medium;

(d) contacting means, positioned to urge the printhead means into constant force contact with the print medium at all times when contacting said print medium; and (e) head adjusting means for adjusting the printhead means in a plane substantially parallel to the print medium comprising an adjustable eccentric means seated in said carriage and extending through said bracket and causing relative displacement between the printhead carriage and the bracket means responsive to rotation of said eccentric means, causing the bracket means and the printhead means to move parallel to the print medium.

2. The printer of claim 1 wherein the printhead means comprises a thermal printhead.

3. The printer of claim 2 wherein the bracket means comprises a heat sink having fins.

4. The printer of claim 3 wherein the motive means comprises a screw.

5. The printer of claim 4 wherein the printhead carriage is engaged by the screw and is moved forward and backward across the surface of the print medium.

6. The printer of claim 1 wherein the contacting means comprises a torsion spring coupled between the bracket means and the printhead carriage.

7. The printer of claim 6 wherein the head adjusting means comprises an adjustable eccentric means seated in said carriage and extending through said bracket and causing relative displacement between the printhead carriage and the bracket means responsive to rotation of said eccentric means, causing the bracket means and the printhead means to move parallel to the print medium.

8. The printer of claim 1 wherein the adjustable eccentric means further comprises a snap-in retainer slot formed in the printhead carriage, an adjustment slot formed in the bracket means, and an eccentric pin that passes through the snap-in retainer slot and the adjustment slot to cause the bracket means to move with respect to the printhead carriage when the eccentric pin is turned.

9. A non-impact printhead assembly for forming characters on a print medium comprising:

(a) printhead carriage means;

(b) bracket means, pivotally connected to the printhead carriage means;

(c) printhead means, secured to the bracket means and positioned to contact the print medium;

(d) contacting means, to urge the head means into constant force contact with the print medium at all times when in contact with the print medium; and (e) head adjusting means, for adjusting the printhead means in a plane substantially parallel to the print medium comprising an adjustable eccentric means seated in said carriage and extending through said bracket and causing relative displacement between the printhead carriage and the bracket means responsive to rotation of said eccentric means, causing the bracket means and the printhead means to move parallel to the print medium.

10. The assembly of claim 9 wherein the printhead means comprises a thermal printhead.

11. The printer of claim 10 wherein the bracket means comprises a heat sink having fins.

12. The printer of claim 10 wherein the contacting means comprises a torsion spring coupled between the bracket means and the printhead carriage.

13. The printer of claim 12 wherein the head adjusting means comprises an adjustable eccentric means seated in said carriage and extending through said bracket and causing relative displacement between the printhead carriage and the bracket means responsive to rotation of said eccentric means, causing the bracket means and the printhead means to move parallel to the print medium.

14. The assembly of claim 9 wherein the adjustable eccentric means further comprises a snap-in retainer slot formed in the printhead carriage, an adjustment slot formed in the bracket means, and an eccentric pin that passes through the snap-in retainer slot and the adjustment slot to cause the bracket means to move with respect to the printhead carriage when the eccentric pin is turned.

* * * * *